US012620266B2

(12) United States Patent
Chen et al.

(10) Patent No.: US 12,620,266 B2
(45) Date of Patent: May 5, 2026

(54) FINGERPRINT TEMPLATE UPDATING METHOD AND DEVICE

(71) Applicant: Samsung Electronics Co., Ltd.,
Suwon-si (KR)

(72) Inventors: Jiangbo Chen, Xi'an (CN); Xiaochun Yan, Xi'an (CN); Chunmiao Jiang, Xi'an (CN); Hanhui Li, Xi'an (CN); Huaiwen Bai, Xi'an (CN); Wenyan Zheng, Xi'an (CN); Yanjun Chen, Xi'an (CN)

(73) Assignee: Samsung Electronics Co., Ltd.,
Suwon-si (KR)

( * ) Notice: Subject to any disclaimer, the term of this patent is extended or adjusted under 35 U.S.C. 154(b) by 5 days.

(21) Appl. No.: 18/806,851

(22) Filed: Aug. 16, 2024

(65) Prior Publication Data

US 2025/0157261 A1     May 15, 2025

(30) Foreign Application Priority Data

Nov. 9, 2023     (CN) .......................... 202311489602.3

(51) Int. Cl.
*G06V 40/50*          (2022.01)
*G06V 40/12*          (2022.01)
(52) U.S. Cl.
CPC .......... *G06V 40/50* (2022.01); *G06V 40/1365* (2022.01)
(58) Field of Classification Search
CPC ............................ G06V 40/50; G06V 40/1365
See application file for complete search history.

(56) References Cited

U.S. PATENT DOCUMENTS

| | | | | |
|---|---|---|---|---|
| 9,471,765 | B1 * | 10/2016 | Setterberg .......... | G06V 40/1365 |
| 10,002,242 | B2 | 6/2018 | Jakobsson et al. | |
| 10,223,574 | B2 | 3/2019 | Zhou | |
| 10,482,311 | B2 | 11/2019 | Wu et al. | |
| 2015/0227740 | A1 * | 8/2015 | Boshra .................... | G06F 21/32 |
| | | | | 726/18 |
| 2016/0125223 | A1 | 5/2016 | Boshra et al. | |
| 2017/0344804 | A1 * | 11/2017 | Zhou ...................... | G06V 40/12 |
| 2019/0005342 | A1 | 1/2019 | Rosqvist | |
| 2022/0164426 | A1 | 5/2022 | Mequanint et al. | |
| 2025/0166419 | A1 * | 5/2025 | Guo ................... | G06V 40/1318 |

FOREIGN PATENT DOCUMENTS

| | | | | |
|---|---|---|---|---|
| CN | 106021606 | A | 10/2016 | |
| CN | 106022290 | A | 10/2016 | |
| CN | 106372609 | A | 2/2017 | |
| SE | 1650034 | A1 * | 7/2017 | ............. G06V 40/50 |

* cited by examiner

*Primary Examiner* — Lixi C Simpson
(74) *Attorney, Agent, or Firm* — Fish & Richardson P.C.

(57)          ABSTRACT

A fingerprint template updating method and device is provided. The fingerprint template updating method includes: in response to an acquired current fingerprint matching one of at least one fingerprint template, determining whether to update the at least one fingerprint template using the current fingerprint based on a matching status of a first number of fingerprints acquired prior to the current fingerprint and/or a second number of fingerprints acquired after the current fingerprint.

12 Claims, 4 Drawing Sheets

| Matching event | $1^{st}$ | $2^{nd}$ | $3^{rd}$ | $4^{th}$ | $5^{th}$ | $6^{th}$ | $7^{th}$ | $8^{th}$ | $9^{th}$ | $10^{th}$ | $11^{th}$ | $12^{th}$ | $13^{th}$ | $14^{th}$ | $15^{th}$ | $16^{th}$ | $17^{th}$ | $18^{th}$ | $19^{th}$ | $20^{th}$ | $21^{th}$ |
|---|---|---|---|---|---|---|---|---|---|---|---|---|---|---|---|---|---|---|---|---|---|
| Matching results P: succeed F: failure | P | P | F | P | F | P | P | P | P | P | P | P | P | P | F | P | P | P | F | P | P |
| Matching scores | 8.2 | 8.3 | 6.1 | 9.0 | 3.1 | 8.7 | 8.3 | 8.7 | 8.3 | 8.7 | 9.5 | 9.6 | 9.7 | 8.1 | 5.0 | 8.1 | 8.7 | 8.3 | 6.7 | 8.3 | 8.7 |

FIG. 1

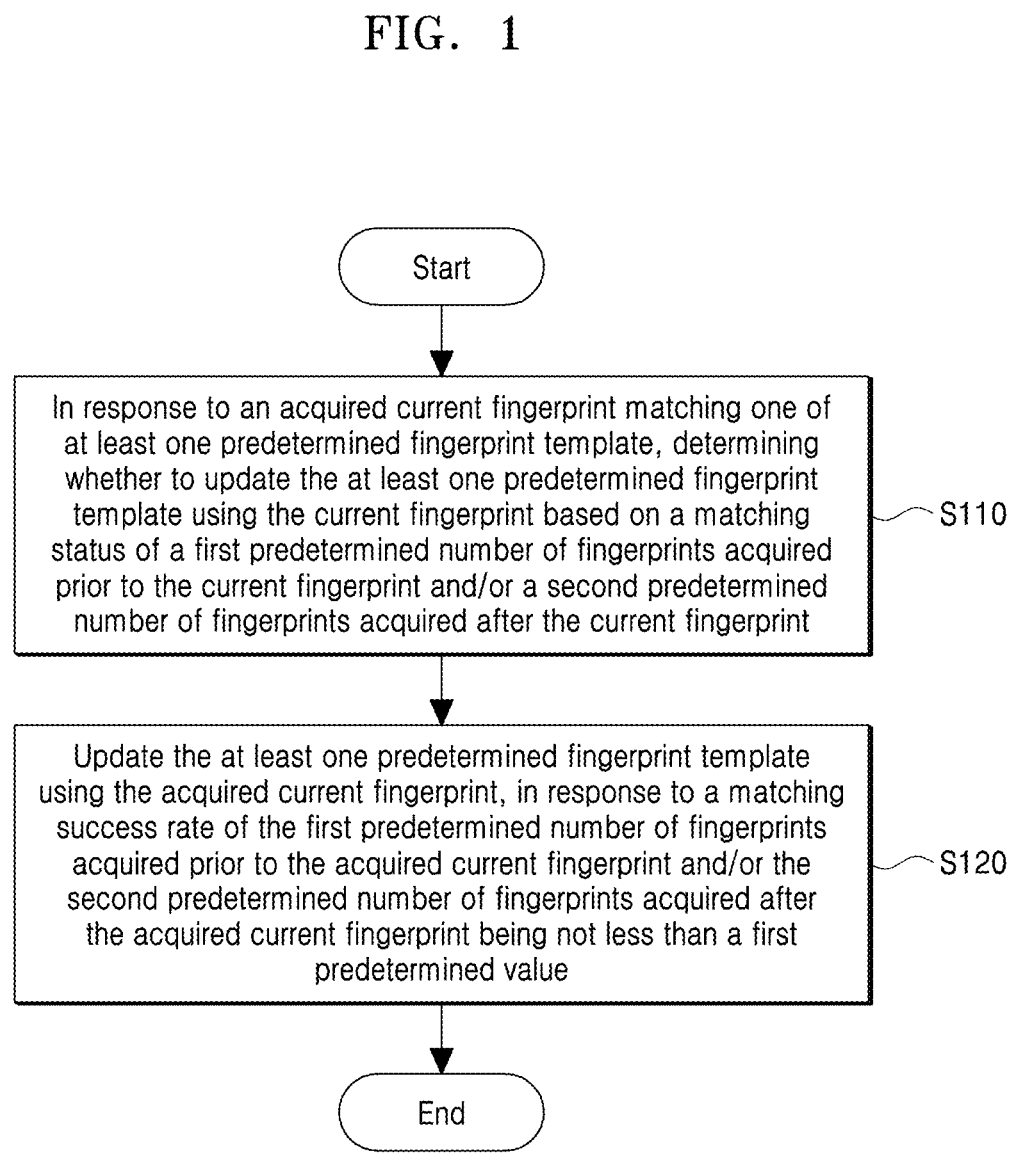

Start

In response to an acquired current fingerprint matching one of at least one predetermined fingerprint template, determining whether to update the at least one predetermined fingerprint template using the current fingerprint based on a matching status of a first predetermined number of fingerprints acquired prior to the current fingerprint and/or a second predetermined number of fingerprints acquired after the current fingerprint —S110

Update the at least one predetermined fingerprint template using the acquired current fingerprint, in response to a matching success rate of the first predetermined number of fingerprints acquired prior to the acquired current fingerprint and/or the second predetermined number of fingerprints acquired after the acquired current fingerprint being not less than a first predetermined value —S120

End

FIG. 2A

| Matching event | 1st | 2nd | 3rd | 4th | 5th | 6th | 7th | 8th | 9th | 10th | 11th | 12th | 13th | 14th | 15th | 16th | 17th | 18th | 19th | 20th | 21th |
|---|---|---|---|---|---|---|---|---|---|---|---|---|---|---|---|---|---|---|---|---|---|
| Matching results P: succeed F: failure | P | P | F | P | F | P | P | P | P | P | P | P | P | P | F | P | P | P | F | P | P |
| Matching scores | 8.2 | 8.3 | 6.1 | 9.0 | 3.1 | 8.7 | 8.3 | 8.7 | 8.3 | 8.7 | 9.5 | 9.6 | 9.7 | 8.1 | 5.0 | 8.1 | 8.7 | 8.3 | 6.7 | 8.3 | 8.7 |

FIG. 2B

| | Preset fingerprint template | T1 | T2 | T3 | T4 | T5 | T6 | T7 | T8 | T9 | T10 | T11 | T12 | T13 | T14 | T15 | T16 |
|---|---|---|---|---|---|---|---|---|---|---|---|---|---|---|---|---|---|---|
| The first matching | Used | ✓ | ✓ | ✓ | ✓ | ✓ | ✓ | ✓ | | | | | | | | | |
| | Successful matched | × | × | × | × | × | × | ✓ | | | | | | | | | |
| The second matching | Used | ✓ | ✓ | ✓ | ✓ | ✓ | ✓ | ✓ | ✓ | ✓ | ✓ | | | | | | |
| | Successful matched | × | × | × | × | × | × | × | × | × | ✓ | | | | | | |
| The third matching | Used | ✓ | ✓ | ✓ | | | | | | | | | | | | | |
| | Successful matched | × | × | ✓ | | | | | | | | | | | | | |
| | Number of usage | 3 | 3 | 3 | 2 | 2 | 2 | 2 | 1 | 1 | 1 | | | | | | |
| | Number of usage Successful matched | | | 1 | | | | 1 | | 1 | 1 | | | | | | |

FINGERPRINT TEMPLATE UPDATING METHOD AND DEVICE

CROSS-REFERENCE TO RELATED APPLICATION

This application claims priority under 35 U.S.C. § 119 to Chinese Patent Application No. 202311489602.3 filed on Nov. 9, 2023 in the State Intellectual Property Office of the P.R.C., the contents of which are incorporated herein by reference in their entirety.

TECHNICAL FIELD

The present inventive concepts relate, in general, to fingerprint recognition, more particularly, to fingerprint template updating methods and devices.

BACKGROUND

Human fingerprint features are unique, however, due to various factors such as accidents, aging of the collection equipment, and molting of the finger, the extracted fingerprint information may have changes of shapes and features in localized areas. A fingerprint recognition device needs to record a number of preset fingerprint templates as matching templates before normal use, and if the currently extracted fingerprint has many differences from the preset fingerprint templates due to, for example, various factors such as those mentioned above, fingerprint matching performance maybe deteriorated.

Conventionally, a method of dynamically updating the templates is proposed, so that the fingerprint information changed by the user is timely updated to the preset fingerprint templates, and user experience is ensured by updating the templates.

However, existing template updating methods do not sufficiently consider risks of updating the templates, for example, if fingerprints of other people are mistakenly matched as successful, the fingerprints may also be updated to the preset fingerprint templates, which may increase the probability of subsequent mismatches; or, the existing template updating methods, although considering reducing or mitigating the updating of the mismatched fingerprints, are not sufficiently effective, are hard to implement, and consume a large amount of resources.

SUMMARY

According to some example embodiments, a fingerprint template updating method is provided, comprising: in response to an acquired current fingerprint matching one of at least one fingerprint template, determining whether to update the at least one fingerprint template using the acquired current fingerprint based on a matching status of a first number of fingerprints acquired prior to the acquired current fingerprint and/or a second number of fingerprints acquired after the acquired current fingerprint.

In some example embodiments, the determining of whether to update the at least one fingerprint template using the acquired current fingerprint may comprise: determining to update the at least one fingerprint template using the acquired current fingerprint, in response to a matching success rate of the first number of fingerprints acquired prior to the acquired current fingerprint and/or the second number of fingerprints acquired after the acquired current fingerprint being not less than a first value.

In some example embodiments, the determining of updating the at least one fingerprint template using the acquired current fingerprint may comprise: determining whether a matching success rate of the first number of fingerprints is not less than the first value; storing the acquired current fingerprint in a buffer storage unit, in response to the matching success rate of the first number of fingerprints not being less than the first value; determining whether a matching success rate of the second number of fingerprints is not less than the first value after the matching of the second number of fingerprints is completed; and determining to update the at least one fingerprint template using the acquired current fingerprint in response to the matching success rate of the second number of fingerprints not being less than the first value.

In some example embodiments, the determining of updating the at least one fingerprint template using the acquired current fingerprint may comprise: in response to a similarity of the acquired current fingerprint to the one of the at least one fingerprint template at a time of matching being not less than a second value, updating the one fingerprint template using the acquired current fingerprint; and in response to the similarity of the acquired current fingerprint to the one of the at least one fingerprint template at the time of matching being less than the second value, updating a fingerprint template with a least number of successful matches among the at least one fingerprint template using the acquired current fingerprint.

In some example embodiments, the updating of the fingerprint template with the least number of successful matches among the at least one fingerprint template using the acquired current fingerprint may comprise: in response to the fingerprint template with the least number of successful matches being a preset protected template, updating another fingerprint template with a least number of successful matches, except for the preset protected template, using the acquired current fingerprint, among the at least one fingerprint template.

In some example embodiments, the at least one fingerprint template updating may be stopped in response to a fingerprint matching success rate being less than a third value and/or a number of times of fingerprint matching within a time period being not less than a fourth value.

According to some example embodiments, a fingerprint template updating device is provided, comprising: processing circuitry configured to, in response to an acquired current fingerprint matching one of at least one fingerprint template, determine whether to update the at least one fingerprint template using the acquired current fingerprint based on a matching status of a first number of fingerprints acquired prior to the acquired current fingerprint and/or a second number of fingerprints acquired after the acquired current fingerprint.

In some example embodiments, the processing circuitry may be further configured to: determine whether to update the at least one fingerprint template using the acquired current fingerprint in response to a matching success rate of the first number of fingerprints acquired prior to the acquired current fingerprint and/or the second number of fingerprints acquired after the acquired current fingerprint being not less than a first value.

In some example embodiments, the fingerprint template updating device may further comprise: a buffer storage unit, wherein the processing circuitry is further configured to: determine whether a matching success rate of the first number of fingerprints is not less than the first value; store the acquired current fingerprint in the buffer storage unit, in response to the matching success rate of the first number of fingerprints not being less than the first value; determine whether a matching success rate of the second number of fingerprints is not less than the first value after the matching of the second number of fingerprints is completed; and determine to update the at least one fingerprint template using the acquired current fingerprint in response to the matching success rate of the second number of fingerprints not being less than the first value.

In some example embodiments, the processing circuitry may be further configured to: in response to a similarity of the acquired current fingerprint to the one of the at least one fingerprint template at a time of matching being not less than a second value, update the one fingerprint template using the acquired current fingerprint; and in response to the similarity of the acquired current fingerprint to the one of the at least one fingerprint template at the time of matching being less than the second value, update a fingerprint template with a least number of successful matches among the at least one fingerprint template using the acquired current fingerprint.

In some example embodiments, the processing circuitry may be further configured to: in response to the fingerprint template with the least number of successful matches being a preset protected template, update another fingerprint template with a least number of successful matches, except for the preset protected template, using the acquired current fingerprint, among the at least one fingerprint template.

In some example embodiments, the processing circuitry may be further configured to: stop the at least one fingerprint template updating in response to a fingerprint matching success rate being less than a third value and/or a number of times of fingerprint matching within a time period being not less than a fourth value.

According to some example embodiments, there is provided an electronic device including a memory having computer-executable instructions stored thereon and a processor, the instructions, when executed by the processor, cause the electronic device to perform the preceding method.

According to some example embodiments, there is provided a computer-readable medium having a computer program stored thereon, and when the computer program is executed by a processor cause an electronic device to perform the preceding method.

According to some example embodiments, by determining whether to update the fingerprint templates using the current fingerprint based on the matching status of fingerprints acquired before the current fingerprint and/or fingerprints acquired after the current fingerprint, the updating of mismatched fingerprints may be reduced or mitigated much better and the security of the updating may be ensured, so that a mismatching rate does not increase due to the new added fingerprint template, thus the matching performance may be greatly improved; in addition, the selection of fingerprint templates to be updated is more effective and takes into account of a utilization rate, a quality, and a variety of the fingerprint templates; in addition, by stopping the template updating in a specific case, the security may be further ensured.

BRIEF DESCRIPTION OF DRAWINGS

The above and other objects and features of the present disclosure will become clearer through the following detail description in conjunction with the drawings, wherein FIG. 1 is a flowchart illustrating a fingerprint template updating method according to some example embodiments;

FIG. 2A and FIG. 2B are diagrams illustrating a fingerprint template updating method according to some example embodiments;

DETAILED DESCRIPTION

Figure 3:
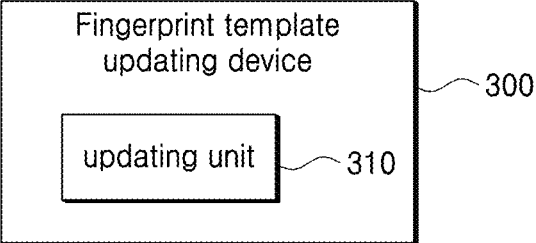
FIG. 3 is a block diagram illustrating a fingerprint template updating device according to some example embodiments.

Hereinafter, various example embodiments of the inventive concepts are described with reference to the accompanying drawings, in which like reference numerals are used to depict the same or similar elements, features, and structures. However, the inventive concepts are not intended to be limited by the various example embodiments described herein to a specific example embodiment and it is intended that the example embodiments covers all modifications, equivalents, and/or alternatives of the inventive concepts, provided they come within the scope of the appended claims and their equivalents. The terms and words used in the following description and claims are not limited to their dictionary meanings, but, are merely used to enable a clear and consistent understanding of the inventive concepts. Accordingly, it should be apparent to those skilled in the art that the following description of various example embodiments of the inventive concepts are provided for illustration purpose only and not for the purpose of limiting the inventive concepts as defined by the appended claims and their equivalents.

It is to be understood that the singular forms include plural forms, unless the context clearly dictates otherwise. The terms "include," "include," and "have", used herein, indicate disclosed functions, operations, or the existence of elements, but does not exclude other functions, operations, or elements.

For example, the expressions "A or B," or "at least one of A and/or B" may indicate A and B, A, or B. For instance, the expression "A or B" or "at least one of A and/or B" may indicate (1) A, (2) B, or (3) both A and B.

In various example embodiments of the inventive concepts, it is intended that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

The expression "configured to", used in describing various example embodiments of the inventive concepts, may be used interchangeably with expressions such as "suitable for," "having the capacity to," "designed to," "adapted to," "made to," and "capable of", for example, according to the situation. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

As used herein, the singular form "a" and "an" are intended to include the plural forms as well, unless the context clearly indicates otherwise. Although the terms first, second, and the like may be used herein to describe various elements, components, steps, and/or operations, these terms are only used to distinguish one element, component, step or operation from another element, component, step, or operation.

The terms used herein are to describe example embodiments of the inventive concepts, and are not intended to limit the scope of other example embodiments. Unless otherwise indicated herein, all terms used herein, including technical or scientific terms, may have the same meanings that are generally understood by a person skilled in the art. In general, terms defined in a dictionary should be considered to have the same meanings as the contextual meanings in the related art, and, unless clearly defined herein, should not be understood differently or as having an excessively formal meaning. In any case, even terms defined in the present disclosure are not intended to be interpreted as excluding embodiments of the present disclosure.

FIG. 1 is a flowchart illustrating a fingerprint template updating method according to some example embodiments.

Referring to FIG. 1, at step S110, in response to an acquired current fingerprint matching one of at least one predetermined fingerprint template, whether to update the at least one predetermined fingerprint template may be determined using the acquired current fingerprint based on a matching status of a first predetermined number of fingerprints acquired prior to the current fingerprint and/or a second predetermined number of fingerprints acquired after the acquired current fingerprint.

The theoretical foundation for this operation is described in detail below according to some example embodiments.

According to some example embodiments, when a mismatch occurs between the acquired current fingerprint and the at least one predetermined fingerprint template, the success rate of several fingerprints matching before and after this mismatch may be much lower than normal, especially when a fingerprint recognition device (e.g., fingerprint card, etc.) has been misappropriated and repeatedly attempted to be cracked. For example, if the fingerprint recognition device is normally held (or, for example, if the fingerprint recognition device is in normal use), there is no chance, or there may be a lower chance, of updating a mismatched fingerprint; if the fingerprint recognition device is accidentally misappropriated and repeated attempts are made, the following cases, as non-limiting examples, may exist:

Case 1: repeated attempts are made several times, with one successful match occurring in between;

Case 2: success on the first attempt, followed by continued attempts and occasional success with a very low probability;

Case 3: multiple consecutive successful matches;

Case 4: never success.

According to some example embodiments, in fingerprint recognition devices, the occurrence probability of Case 1 and Case 2 may be very low, Case 3 may not usually occur, and the most likely case to occur may be Case 4, but example embodiments are not limited thereto, for example, there may be various other cases with the same and/or different occurrence probabilities that may occur. Therefore, in some example embodiments, if, for example, Case 1 and Case 2 occur, e.g., if a mismatch occurs, the matching success rate of several times before and after the mismatch will be much lower than normal. In accordance with the above example cases, according to some example embodiments, for example, as shown in FIG. 1, in a case where the acquired current fingerprint is matched with the predetermined fingerprint template, whether to update the predetermined fingerprint template may be determined based on the matching status of the fingerprints matched before and after the acquired current fingerprint.

In some example embodiments, with respect to operation S110, for example, the determining of whether to update the at least one predetermined fingerprint template using the acquired current fingerprint may include: determining to update the at least one predetermined fingerprint template using the acquired current fingerprint, in response to a matching success rate of the first predetermined number of fingerprints acquired prior to the acquired current fingerprint and/or a second predetermined number of fingerprints acquired after the current fingerprint being not less than a first predetermined value, but example embodiments are not limited thereto. Herein, only as an example and not as a limitation, the first predetermined number of fingerprints and the second predetermined number of fingerprints may each have a value of 10, and the first predetermined (or, alternatively, determined) value may be 70%. In some example embodiments, if the matching success rate of the first predetermined number of fingerprints acquired prior to the acquired current fingerprint and/or the second predetermined number of fingerprints acquired after the acquired current fingerprint is less than the first predetermined value, the at least one predetermined fingerprint template may not be updated.

In some example embodiments, with respect to operation S120, the determining of updating the at least one predetermined fingerprint template using the acquired current fingerprint may include: determining whether a matching success rate of the first predetermined number of fingerprints is not less than the first predetermined value; placing and/or storing the acquired current fingerprint into a buffer storage unit, in response to the matching success rate of the first predetermined number of fingerprints not being less than the first predetermined value; determining whether a matching success rate of the second predetermined number of fingerprints is not less than the first predetermined value after the matching of the second predetermined number of fingerprints is completed; determining to update the at least one predetermined fingerprint template using the acquired current fingerprint in response to the matching success rate of the second predetermined number of fingerprints not being less than the first predetermined value. For example, the matching success rate of previously acquired fingerprints may be determined first, then waiting for matching of later acquired fingerprints, and determining to update the at least one predetermined fingerprint template using the acquired current fingerprint based on the matching success rate of the later acquired fingerprints.

In some example embodiments, only as an example and not as a limitation, the at least one predetermined fingerprint template may be updated using the acquired current fingerprint according to the following strategy and/or method: in response to a similarity of the acquired current fingerprint to the one of the at least one predetermined fingerprint template at the time of matching being not less than a second predetermined value, updating the one predetermined fingerprint template using the acquired current fingerprint; in response to the similarity of the acquired current fingerprint to the one of the at least one predetermined fingerprint template at the time of matching being less than the second predetermined value, updating a predetermined fingerprint template with the least number of times being successful matched among the at least one predetermined fingerprint template using the acquired current fingerprint. For example, based on the similarity obtained when matching the acquired current fingerprint, if the similarity is large, the acquired current fingerprint can be used to update the preset fingerprint template that matched thereto; for example, due to the fact that the large similarity indicates that most of the features of the acquired current fingerprint is the same with the preset fingerprint template and the majority of the features are similar to the preset fingerprint template, and updating the template in such case is, or may be, safe; on the contrary, in some example embodiments, if other preset fingerprint templates are updated in such case, this may lead to a twofold problem, e.g., template redundancy on one hand and loss of template diversity on the other hand (because one of the preset fingerprint templates representing other regions, e.g., other regions/areas of an extracted fingerprint, is replaced). On the other hand, in some example embodiments, if the acquired current fingerprint obtains a less similarity when being matched, the acquired current fingerprint can be used to update a preset fingerprint template with the least number times being successful matched among the preset fingerprint templates; this is due to the fact that, for example, although the matching of the current fingerprint is successful, the similarity is medium or low, which may indicate that there is a significant portion of characteristics that may not exist in the preset fingerprint template, and that this portion of the new characteristics is likely to be outside of the matching region of the preset fingerprint template, it is also possible, for example, that this portion of the new characteristics is in the matching region but caused by aging of the fingerprint; in this case, the preset fingerprint template with the least number times being successful matched among the preset fingerprint templates can be replaced, and in addition, it is also possible to merge the new characteristics into the matched preset fingerprint template, and the updated template carries the latest aging information or information of different regions, which may help to increase the matching success rate. Herein, the second predetermined value may be set by the person skilled in the art according to practical needs and experience, and will not be repeated herein.

It should be noted that in the above operation of updating the preset fingerprint templates, if the preset fingerprint template is a preset protected template, the preset fingerprint template is not to be updated, or another preset fingerprint template is selected for updating. For example, in response to the predetermined fingerprint template with the least number of times being successful matched being a preset protected template, updating a predetermined fingerprint template with the least number of times being successful matched, except for the preset protected template using the current fingerprint, among the at least one predetermined fingerprint template. Herein, only as an example and not as a limitation, the preset protected template can be a fingerprint template set by the user, a fingerprint template set for different angles, or a fingerprint template with high matching success rate, and so on.

In some example embodiments, when updating the templates, the preset fingerprint templates need to be secured as much as possible. Therefore, only as an example and not as a limitation, the template updating is stopped in response to a fingerprint matching success rate being less than a third predetermined value and/or a number of times of fingerprint matching within a predetermined time period being not less than a fourth predetermined value. Herein, in some example embodiments, the third predetermined value and the fourth predetermined value may be set by the person skilled in the art according to practical needs and experience, and will not be repeated herein.

It should be appreciated that, in some example embodiments, relevant statistical information may be stored and/or updated at each fingerprint matching, the statistical information may include information such as the matching result, the matching similarity (matching score), the matched template of each matching, and the like, for use in the determination of the matching status of the first predetermined number of fingerprints acquired before the current fingerprint and/or the second predetermined number of fingerprints acquired after the current fingerprint as well as in the selection of the preset fingerprint template with the least number of times being successful matched. In some example embodiments, each fingerprint matching may be accompanied by an updating of the statistical information if the fingerprints to be verified in the buffer storage unit have not changed, and the statistical information may be reset if the fingerprints to be verified in the buffer storage unit have changed.

Detailed examples of a fingerprint template updating method according to some example embodiments will be described below in conjunction with FIG. 2A and FIG. 2B. FIG. 2A and FIG. 2B are diagrams illustrating a fingerprint template updating method according to some example embodiments.

As shown in FIG. 2A, in some example embodiments, it can be counted whether the matching success rate of the first predetermined number of fingerprints acquired before the acquired current fingerprint (as an example only and not as a limitation, 10 times in FIG. 2) and the second predetermined number of fingerprints acquired after the acquired current fingerprint (as an example only and not as a limitation, 10 times in FIG. 2) is not less than the first predetermined value (as an example only and not as a limitation, 70%), and starting from the 1st fingerprint matching to the 21st fingerprint matching, the fingerprint matching results and matching scores for each time can be shown, for example, as illustrated in FIG. 2A.

At the 1st matching, there is no information about the success rate of the first ten (10) fingerprint matching, and it is impossible to determine whether the 1st matching fingerprint is a mismatched fingerprint. Therefore, the first fingerprint is not put into the buffer storage unit. Similarly, the fingerprints of the 2nd to 10th matching are not put into the buffer storage unit.

At the 11th matching, the success rate of the previous 10 matching is already available, which is 80% according to FIG. 2A and is not less than the first predetermined value (e.g., 70%). At this time, in some example embodiments, the fingerprint of the 11th matching may be put into the buffer storage unit to wait for verification.

At the 12th to 20th matching, a fingerprint of the 11th matching to be verified already exists in the buffer storage unit, and if the buffer storage unit has a limited storage capacity, the fingerprints of the 12th to 20th matching may not be put into the buffer storage unit. In some example embodiments, if the buffer storage unit has a corresponding storage capacity, the fingerprints of the $12^{th}$ to $20^{th}$ matching may be put into the buffer storage unit, and the person skilled in the art may set the buffer storage unit according to an actual situation. Thus, in some example embodiments, in a case where the storage capacity of the buffer storage unit is limited, the requirement for system resources can be reduced since only one copy of the fingerprint template to be updated is dynamically stored.

At the 21st matching, it is already possible to determine that the matching success rate of the fingerprints for the following ten (10) times after the fingerprint of the 11th matching within the buffer storage unit is 80% according to FIG. 2A, which is not less than a first predetermined value (e.g., 70%). Subsequently, in some example embodiments, in combination with the matching success rate of the previous 10 times, it can be determined that the fingerprint of the 11th matching is not a mismatched fingerprint, so that the fingerprint of the 11th matching can be used to update the predetermined fingerprint template. Herein, the selection of the preset fingerprint template being updated may be the same as described in relation to FIG. 1 and is therefore not repeated herein.

In some example embodiments, for the predetermined fingerprint template with the least number of times being successfully matched among the predetermined fingerprint templates being updated may be obtained by, for example, a statistical method. For example, in some example embodiments, as shown in FIG. 2B, it is assumed that three consecutive fingerprint matching are performed.

In some example embodiments, in the first matching, matching a fingerprint input in the first time with the preset fingerprint templates in turn, and the matching is successful when the matching reaches the 7th preset fingerprint template (herein, the matching successful may mean that the matching similarity reaches or exceeds a predetermined threshold).

In some example embodiments, in the second matching, matching a fingerprint input in the second time with the preset fingerprint templates in turn, and the matching is successful when the matching reaches the 10th preset fingerprint template.

In some example embodiments, in the third matching, matching a fingerprint input in the third time is matched with the preset fingerprint templates in turn, and the matching is successful when the matching reaches the 3rd preset fingerprint template.

In some example embodiments, from the statistics as shown in FIG. 2B, it can be seen that the preset fingerprint templates T1 and T2 are the preset fingerprint templates with the least number of times being successfully matched because they were each used, for example, three times, but none of them were matched successfully. In some example embodiments, the preset fingerprint templates T11 to T16 have not been used, so it is not possible to determine exactly how useful these templates are. After accumulating a certain number of times, more accurate data may be obtained so that the preset fingerprint template with the least number of times being successful matched in a certain time period may be accurately obtained.

FIG. 3 is a block diagram illustrating a fingerprint template updating device according to some example embodiments.

Referring to FIG. 3, the fingerprint template updating device 300 may include an updating unit 310.

In some example embodiments, the updating unit 310 may be configured to, in response to an acquired current fingerprint matching one of at least one predetermined fingerprint template, determine whether to update the at least one predetermined fingerprint template using the acquired current fingerprint based on a matching status of a first predetermined number of fingerprints acquired prior to the acquired current fingerprint and/or a second predetermined number of fingerprints acquired after the acquired current fingerprint. In some example embodiments, at least part of the updating unit 310 may include or be implemented as processing circuitry such as hardware (e.g., logic circuits) or a combination of hardware and software (e.g., a computer-based electronic system like a processor executing instruction codes or program routines (e.g., a software program). The instruction codes or the program routines may be stored in any storage device located inside or outside the computer-based electronic system).

In some example embodiments, the updating unit 310 may be further configured to: determine to update the at least one predetermined fingerprint template using the acquired current fingerprint in response to a matching success rate of the first predetermined number of fingerprints acquired prior to the acquired current fingerprint and/or the second predetermined number of fingerprints acquired after the acquired current fingerprint being not less than a first predetermined value.

In some example embodiments, the fingerprint template updating device 300 according to some example embodiments may further include a buffer storage unit, so that the updating unit 310 may be further configured to: determine whether a matching success rate of the first predetermined number of fingerprints is not less than the first predetermined value; place and/or store the acquired current fingerprint into a buffer storage unit, in response to the matching success rate of the first predetermined number of fingerprints not being less than the first predetermined value; determine whether a matching success rate of the second predetermined number of fingerprints is not less than the first predetermined value after the matching of the second predetermined number of fingerprints is completed; and determine to update the at least one predetermined fingerprint template using the acquired current fingerprint in response to the matching success rate of the second predetermined number of fingerprints not being less than the first predetermined value.

In some example embodiments, the updating unit 310 may be further configured to: in response to a similarity of the acquired current fingerprint to the one of the at least one predetermined fingerprint template at the time of matching being not less than a second predetermined value, update the one predetermined fingerprint template using the acquired current fingerprint; in response to the similarity of the acquired current fingerprint to the one of the at least one predetermined fingerprint template at the time of matching being less than the second predetermined value, update a predetermined fingerprint template with the least number of times being successful matched among the at least one predetermined fingerprint template using the acquired current fingerprint.

In some example embodiments, the updating unit 310 may be further configured to: in response to the predetermined fingerprint template with the least number of times being successful matched being a preset protected template, update a predetermined fingerprint template with the least number of times being successful matched, except for the preset protected template using the acquired current fingerprint, among the at least one predetermined fingerprint template.

In some example embodiments, the fingerprint template updating device 300 according to some example embodiments may further include an updating protecting unit, configured to stop the template updating in response to a fingerprint matching success rate being less than a third predetermined value and/or a number of times of fingerprint matching within a predetermined time period being not less than a fourth predetermined value. In some example embodiments, at least a part of the updating protecting unit may include or be implemented as processing circuitry such as hardware (e.g., logic circuits) or a combination of hardware and software (e.g., a computer-based electronic system like a processor executing instruction codes or program routines (e.g., a software program). The instruction codes or program routines may be stored in any storage device located inside or outside the computer-based electronic system).

According to some example embodiments, there is provided an electronic device including a memory having computer executable instructions stored thereon and a processor, instructions, when executed by the processor, perform the method as previously described.

According to some example embodiments, there is provided a computer-readable storage medium having instructions stored thereon, when executed, performing the foregoing method. Examples of computer-readable storage media here may include: read only memory (ROM), random access programmable read only memory (PROM), electrically erasable programmable read only memory (EE-PROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state Hard disk (SSD), card storage (such as multimedia card, secure digital (SD) card or extreme digital (XD) card), magnetic tape, floppy disk, magneto-optical data storage device, optical data storage device, hard disk, solid state disk and any other devices configured to store computer programs and any associated data, data files, and data structures in a non-transitory manner, and provide the computer programs and any associated data, data files, and data structures to the processor or the computer, so that the processor or the computer can execute the computer program. The computer program in the above-mentioned computer-readable storage medium may run in an environment deployed in computing equipment such as a client, a host, an agent device, a server, etc. In some example embodiments, the computer program and any associated data, data files and data structures are distributed on networked computer systems, so that computer programs and any associated data, data files, and data structures are stored, accessed, and executed in a distributed manner through one or more processors or computers.

According to some example embodiments, by determining whether to update the predetermined fingerprint templates using the acquired current fingerprint based on the matching status of fingerprints acquired before the acquired current fingerprint and/or fingerprints acquired after the acquired current fingerprint, the updating of mismatched fingerprints may be reduced or mitigated (e.g., the updating of mismatched fingerprints may be reduced or mitigated much better) and the security of the updating may be ensured, such that a mismatching rate does not increase due to the new added fingerprint template, thus the matching performance may be improved or greatly improved; in addition, the selection of fingerprint templates to be updated is more effective and takes into account of a utilization rate, a quality, and a variety of the fingerprint templates; in addition, by stopping the template updating in a specific case, the security may be further ensured.

While the inventive concepts have been shown and described with reference to some example embodiments, those skilled in the art will understand that various changes in form and detail may be made therein without departing from the spirit and scope of the inventive concepts, following claims, and equivalents thereof.

What is claimed is:

1. A fingerprint template updating method, comprising:

in response to an acquired current fingerprint matching one of at least one fingerprint template, determining to update the at least one fingerprint template using the acquired current fingerprint based on a matching success rate of a first number of fingerprints acquired prior to the acquired current fingerprint and/or a second number of fingerprints acquired after the acquired current fingerprint being not less than a first value.

2. The fingerprint template updating method of claim 1, wherein the determining of updating the at least one fingerprint template using the acquired current fingerprint comprises:

determining whether a matching success rate of the first number of fingerprints is not less than the first value;

storing the acquired current fingerprint in a buffer storage unit, in response to the matching success rate of the first number of fingerprints not being less than the first value;

determining whether a matching success rate of the second number of fingerprints is not less than the first value after the matching of the second number of fingerprints is completed; and determining to update the at least one fingerprint template using the acquired current fingerprint in response to the matching success rate of the second number of fingerprints not being less than the first value.

3. The fingerprint template updating method of claim 1, wherein the determining of updating the at least one fingerprint template using the acquired current fingerprint comprises:

in response to a similarity of the acquired current fingerprint to the one of the at least one fingerprint template at a time of matching being not less than a second value, updating the one fingerprint template using the acquired current fingerprint; and in response to the similarity of the acquired current fingerprint to the one of the at least one fingerprint template at the time of matching being less than the second value, updating a fingerprint template with a least number of successful matches among the at least one fingerprint template using the acquired current fingerprint.

4. The fingerprint template updating method of claim 3, wherein the updating of the fingerprint template with the least number of successful matches among the at least one fingerprint template using the acquired current fingerprint comprises:

in response to the fingerprint template with the least number of successful matches being a preset protected template, updating another fingerprint template with a least number of successful matches, except for the preset protected template, using the acquired current fingerprint, among the at least one fingerprint template.

5. The fingerprint template updating method of claim 1, wherein the at least one fingerprint template updating is stopped in response to a fingerprint matching success rate being less than a third value and/or a number of times of fingerprint matching within a time period being not less than a fourth value.

6. An electronic device comprising a memory having computer-executable instructions stored thereon and a processor, the instructions, when executed by the processor, cause the electronic device to perform the method of claim 1.

7. A non-transitory computer readable storage medium having computer-executable instructions stored thereon, the instructions, when executed, cause an electronic device to perform the method of claim 1.

8. A fingerprint template updating device, comprising:

processing circuitry configured to, in response to an acquired current fingerprint matching one of at least one fingerprint template, determine whether to update the at least one fingerprint template using the acquired current fingerprint based on a matching success rate of a first number of fingerprints acquired prior to the acquired current fingerprint and/or a second number of fingerprints acquired after the acquired current fingerprint being not less than a first value.

9. The fingerprint template updating device of claim 8, further comprising:

a buffer storage unit, wherein the processing circuitry is further configured to:

determine whether a matching success rate of the first number of fingerprints is not less than the first value;

store the acquired current fingerprint in the buffer storage unit, in response to the matching success rate of the first number of fingerprints not being less than the first value;

determine whether a matching success rate of the second number of fingerprints is not less than the first value after the matching of the second number of fingerprints is completed; and determine to update the at least one fingerprint template using the acquired current fingerprint in response to the matching success rate of the second number of fingerprints not being less than the first value.

10. The fingerprint template updating device of claim 8, wherein the processing circuitry is further configured to:

in response to a similarity of the acquired current fingerprint to the one of the at least one fingerprint template at a time of matching being not less than a second value, update the one fingerprint template using the acquired current fingerprint; and in response to the similarity of the acquired current fingerprint to the one of the at least one fingerprint template at the time of matching being less than the second value, update a fingerprint template with a least number of successful matches among the at least one fingerprint template using the acquired current fingerprint.

11. The fingerprint template updating device of claim 10, wherein the processing circuitry is further configured to:

in response to the fingerprint template with the least number of successful matches being a preset protected template, update another fingerprint template with a least number of successful matches, except for the preset protected template using the acquired current fingerprint, among the at least one fingerprint template.

12. The fingerprint template updating device of claim 8, wherein the processing circuitry is further configured to:

stop the at least one fingerprint template updating in response to a fingerprint matching success rate being less than a third value and/or a number of times of fingerprint matching within a time period being not less than a fourth value.

* * * * *